United States Patent
Bargy

(10) Patent No.: US 7,089,976 B2
(45) Date of Patent: Aug. 15, 2006

(54) APPARATUS FOR INJECTING SOLVENTS INTO A PNEUMATIC SYSTEM

(76) Inventor: Roy Bargy, 1529 South St., Millbury, OH (US) 43447

(*) Notice: Subject to any disclaimer, the term of this patent is extended or adjusted under 35 U.S.C. 154(b) by 227 days.

(21) Appl. No.: 10/778,509

(22) Filed: Feb. 16, 2004

(65) Prior Publication Data

US 2005/0178439 A1    Aug. 18, 2005

(51) Int. Cl.
*B65B 39/00*    (2006.01)
(52) U.S. Cl. .................. 141/340; 141/11; 141/301
(58) Field of Classification Search .............. 141/2, 141/11, 67, 285, 301, 297, 331–345; 222/207
See application file for complete search history.

(56) References Cited

U.S. PATENT DOCUMENTS

| 4,330,071 A | * | 5/1982 | Ohlson ..................... 222/207 |
| 5,382,422 A | * | 1/1995 | Dieguez et al. ............. 424/45 |
| 5,967,201 A | * | 10/1999 | Gasior ....................... 141/98 |
| 6,098,678 A | * | 8/2000 | Shears ....................... 141/331 |

* cited by examiner

*Primary Examiner*—Timothy L. Maust
(74) *Attorney, Agent, or Firm*—Marshall & Melhorn, LLC

(57) ABSTRACT

A device for adding solvent to a pneumatic system comprises an inlet structure to receive solvent from a supply and a reservoir to hold solvent from the inlet structure. An outlet structure, which is in fluid communication with the reservoir, is designed to connect the reservoir to a pneumatic system. A first stop valve is disposed between the inlet structure and the reservoir, and a second stop valve is disposed between the reservoir and the outlet structure.

12 Claims, 2 Drawing Sheets

APPARATUS FOR INJECTING SOLVENTS INTO A PNEUMATIC SYSTEM

BACKGROUND OF THE INVENTION

1. Field of the Invention

The present invention relates to a system for the injection of solvents into a pneumatic system, particularly for the pneumatic system of a vehicle, for example a tractor-trailer.

2. Summary of Related Art

Large vehicles, particularly tractor-trailers, utilize pneumatic systems for a variety of vehicle functions, for example braking. An ongoing problem with vehicular pneumatic systems is the occurrences of leakage of moisture into the systems, allowing the moisture to accumulate in the pneumatic system. This can cause significant difficulties, particularly if the moisture in the pneumatic system was to freeze during cold temperatures.

One method of dealing with this difficulty is the inclusion of desiccant systems on the vehicles, commonly called air dryers. However, even with these systems installed, moisture can sometimes freeze in the pneumatic system. Additionally, many trucks, particularly older trucks, do not have these air dryers installed.

A known solution to the problem of moisture freezing in the pneumatic system is the addition of a solvent to the pneumatic system. The addition of a solvent, typically a water soluble high vapor pressure solvent, can serve to melt the formed ice and also can help to desiccate the system.

Known processes for the addition of solvent to the systems have several drawbacks. First, it is presently not possible for vehicle driver/operators to make this repair while on the road. Typically, upon freezing, the vehicle must be shut down as the vehicle cannot be safely operated with freezing in the pneumatic system. After vehicle shutdown, steps must be taken to de-ice the vehicle. Often, the vehicle must be towed to a repair facility, for solvent to be added. As an additional complication, the solvent cannot be added while the system is pressurized.

Thus, known processes for the addition of solvents are inefficient and costly for the operators. Costs for towing and labor can significantly affect operating margins. Additionally, as most operators are on relatively tight time schedules, the time for the towing and repair can prevent the cargo from being delivered on a timely basis.

SUMMARY OF THE INVENTION

The present invention defines a system and method for adding solvent to a pneumatic system comprising an inlet structure to receive solvent from a remote supply and a reservoir to hold solvent which has passed through the inlet structure. An outlet structure, which is in fluid communication with the reservoir, is designed to connect the reservoir to a pneumatic system. A first check valve is disposed between the inlet structure and the reservoir, and a second check valve is disposed between the reservoir and the outlet structure.

A method according to the present invention comprises providing solvent into the inlet structure and opening the first stop valve thus allowing solvent to flow from the inlet structure into the reservoir. Subsequently, the second stop valve is opened and solvent is allowed to flow from the reservoir into the pneumatic system of a tractor-trailer.

DETAILED DESCRIPTION OF THE PREFERRED EMBODIMENT

Figure 1:
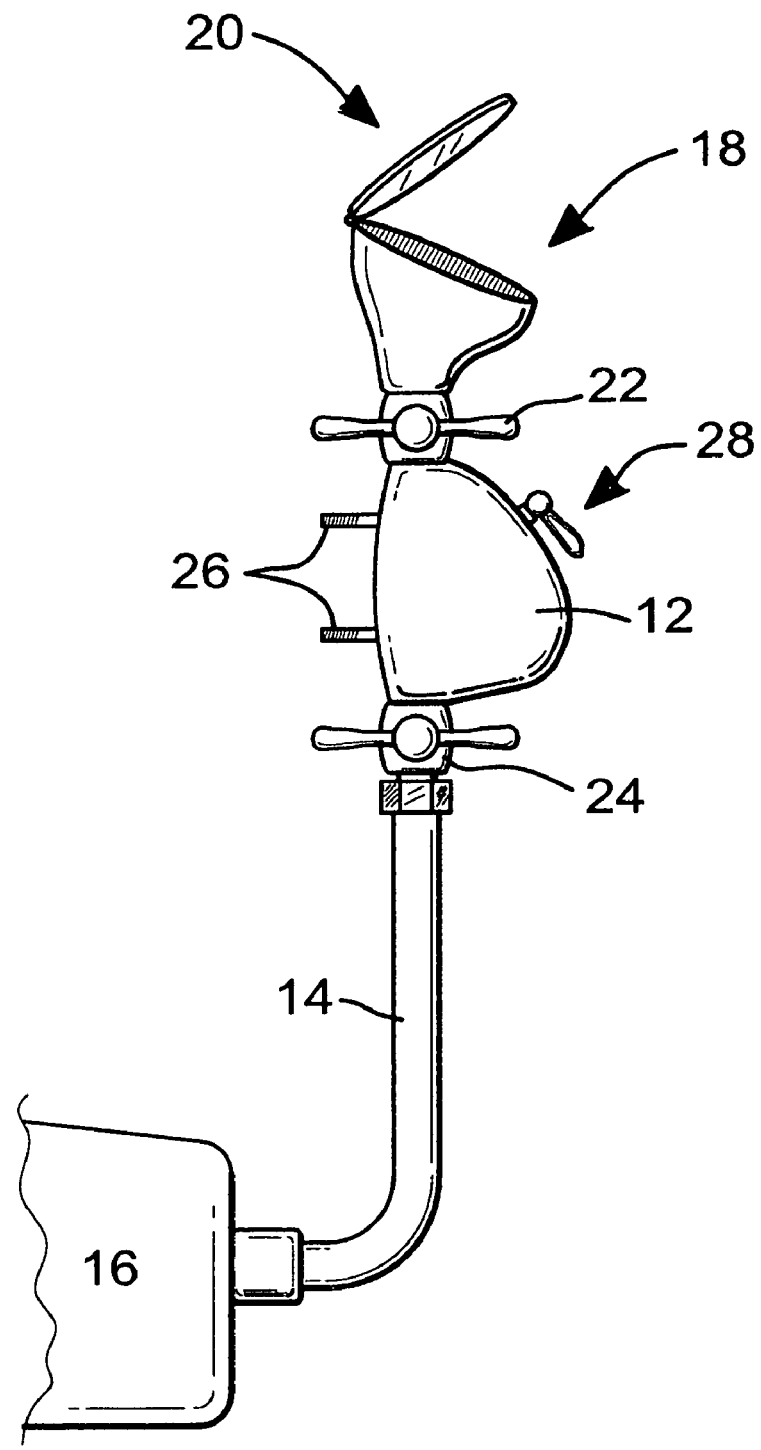
FIG. 1 illustrates a preferred embodiment of the present invention.

FIG. 1 shows a preferred embodiment of a device for adding solvents to a pneumatic system according to the present invention. The device includes a reservoir 12 which is designed to hold a predetermined amount of solvent. In a preferred embodiment of the present invention, the reservoir 12 is made from a solvent resistant material, such as a plastic, more specifically, a plastic such as polyethylene. Metal containers are also appropriate for use as a reservoir as long as they are resistant to the solvent being used. In at least one embodiment of the present invention, transparent or translucent materials, preferably plastics, are preferred so that the operator can visually note the amount of solvent present in the reservoir. Other materials may be suitable in varying embodiments of the present invention.

Solvents for us in the present invention are well known in the field, and are widely marketed as air-brake de-icers or anti-freeze. Typical de-icers include an alcohol, typically methanol, and often include other anti-freeze agents such as ethylene glycol. Such products are well known in the field. Other solvents are also acceptable for use with embodiments of the present invention.

The reservoir 12 is connected to an outlet structure 14 which is designed to connect to the pneumatic system 16 of a vehicle. Preferably, the outlet structure 14 can connect directly to the main pneumatic tank of the vehicle, but alternatively can connect to any convenient part of the pneumatic system, such as preexisting valves or inputs. The outlet structure 14 is preferably a pipe or flexible tubing or hose connecting to the pneumatic system 16. The design and configuration of the outlet structure 14 is dependent upon the location on which the device is mounted on the vehicle. If the device is mounted in a position to connect directly to the pneumatic system 16, the outlet structure 14 may merely be a nipple or other connector to make a secure, leak resistant connection to the pneumatic system 16.

The reservoir also connects to an inlet or input structure 18 through which solvent is added to the system. In a preferred embodiment of the present invention, the input structure comprises a funnel shaped body and a hinged lid 20. The hinged lid is used to prevent solvent from coming out of the device through the inlet, and also to prevent or minimize contaminants from entering the device. Other structures for the input system are possible and consistent with embodiments of the present invention.

As shown in FIG. 1, a first check or pressure valve 22 is preferably disposed between the inlet 18 and the reservoir 12. This first valve can be manually controlled to control fluid flow from the inlet 18 to the reservoir 12. A second check or pressure valve 24 can then be positioned between the reservoir 24 and the outlet structure 14, thus controlling flow from the reservoir 12 to the outlet structure 14.

In a preferred embodiment of the present invention, the first and second pressure valves 22, 24 are in the form of ball valves. However, any valve which is suitable for controlling fluid flow of a solvent in a pressurized system can be used. Additionally, if the system is designed to be used in a non-pressurized system, the valves 22, 24 would not need to be designed to handle the pressure of a pneumatic system. While the invention preferably uses manually controlled valves, automatically controlled valves (for example computer controlled valves) are also suitable for use with embodiments of the present invention.

It is preferred that the device be mounted on the vehicle, so that it is ready for use when needed. To that end, mounting structure 26 is preferably provided on the device, for example on the body of the reservoir 12. The mounting structure can vary and can, for example, be customized for the particular truck cab for which it is to be attached. In a preferred embodiment, the system can be mounted directly on the pneumatic reservoir of the pneumatic system 16.

In another preferred embodiment, a pressure relief valve 28 is installed on the reservoir 12. The pressure relief valve can be used to relieve pressure from the system under non-standard operating conditions (e.g. in the case where excess pressure somehow builds up in the reservoir 12.

Figure 2:
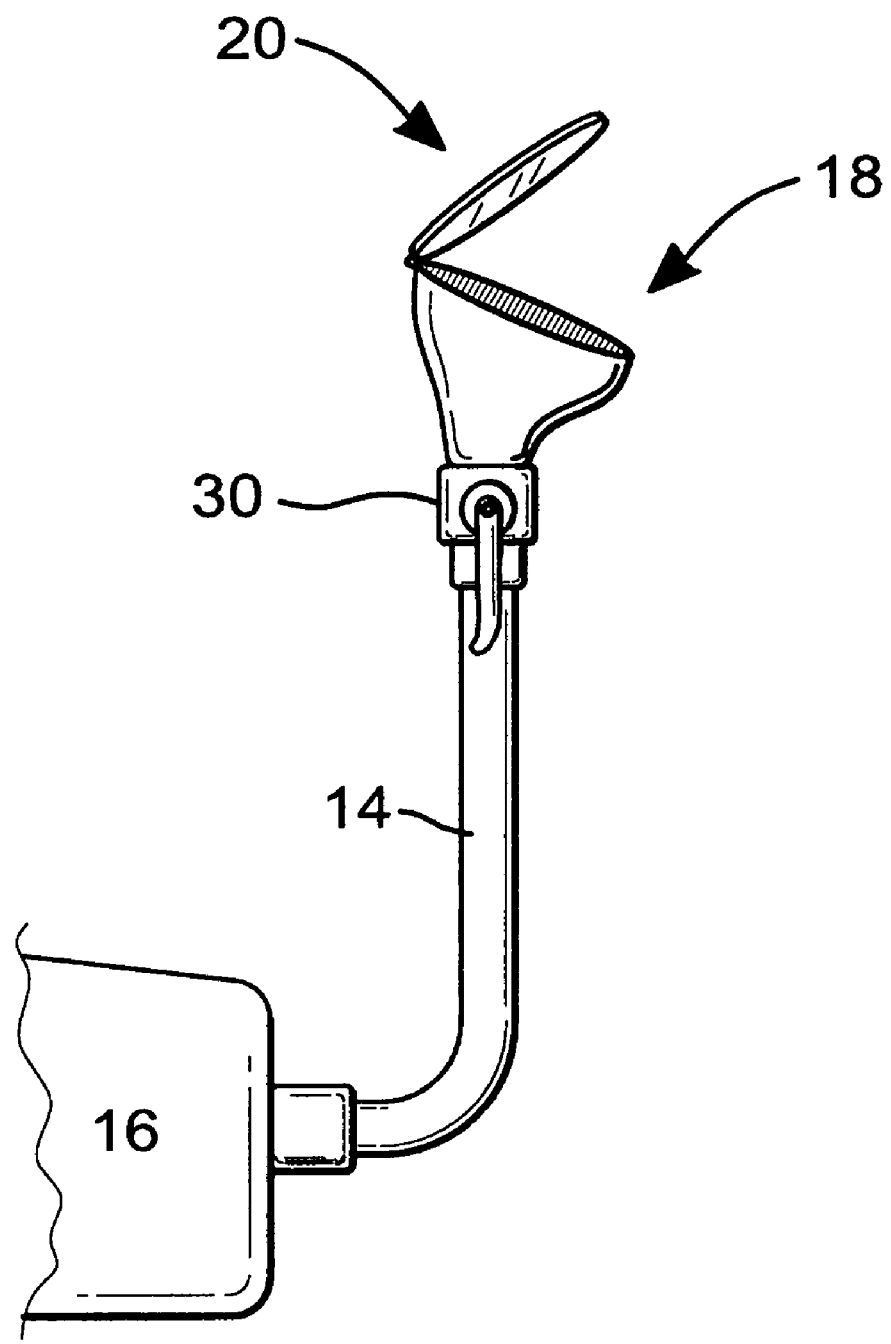
FIG. 2 illustrates an alternative embodiment of the present invention.

FIG. 2 illustrates an additional embodiment of the present invention. The embodiment shown in this Figure is designed to be used when the pneumatic system is not pressurized. In this embodiment, the input structure 18 connects directly to the output structure 14 through a single valve 30. The valve, in this case, does not need to be designed for a pressurized system as the absence of the second valve (as shown in FIG. 1) substantially prevents the use of this system while pressurized. The system illustrated herein is a mechanically simpler and less expensive system than that illustrated in FIG. 1.

An advantage of the system shown in FIG. 1 is that it can be used while the pneumatic system is pressurized or depressurized. To use the system while pressurized, the operator would add solvent to the reservoir 12 through the input structure 18 with the valve 22 open. If the system is pressurized, the valve 24 would need to be closed whiled the reservoir 12 is filling. Subsequently, the valve 22 is closed and the valve 24 is opened. This equalizes the pressure between the reservoir 12 and the pneumatic system 16. As the system is preferably mounted above the input to the pneumatic system, the solvent can then flow from the reservoir 12 through the open valve 24 and the output structure 14 into the pneumatic system 16. This arrangement provides a simple and economical gravity flow system for the addition of solvent to the pneumatic tank. However, in alternative embodiments of the invention, a pumping system could be used to assist introduction of the solvent to the pneumatic system. Through this method and device, the solvent can be added to the pneumatic system while minimizing the pressure drop in the pneumatic system.

Alternatively, if the pneumatic system is not pressurized, the embodiment of FIG. 1 can have both valves 22, 24 open at the same time to allow solvent into the pneumatic system. Additionally, the embodiment shown in FIG. 2 can be used by opening the single valve 30 to add solvent to the pneumatic system 16.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for adding solvent to a pneumatic system comprising:
    an inlet structure to receive solvent from a supply, said inlet structure comprising a funnel shaped device and a hinged lid;
    a reservoir to hold solvent from said inlet structure, said reservoir being in fluid communication with said inlet structure;
    an outlet structure designed to connect said reservoir to a pneumatic system, said outlet structure being in fluid communication with said reservoir;
    a first stop valve disposed between said inlet structure and said reservoir; and
    a second stop valve disposed between said reservoir and said outlet structure.

2. The device according to claim 1, comprising a pressure relief valve disposed on said reservoir.

3. The device according to claim 1, wherein said outlet structure comprises a hose.

4. The device according to claim 1, wherein said outlet structure is configured to connect directly to the main pneumatic tank of a vehicle.

5. The device according to claim 1, comprising a structure adapted to mount the device onto a tractor-trailer.

6. The device according to claim 1, wherein said first and second stop valves are ball valves.

7. A method for adding solvent to a pneumatic system for a vehicle comprising:
    providing a device for adding solvent to a pneumatic system, comprising: an inlet structure to receive solvent from a supply, a reservoir to hold solvent from the inlet structure, which reservoir is in fluid communication with the inlet structure, an outlet structure designed to connect the reservoir to a pneumatic system, which outlet structure is in fluid communication with the reservoir, a first stop valve disposed between the inlet structure and the reservoir and a second stop valve disposed between the reservoir and the outlet structure;
    adding solvent to the inlet structure;
    opening the first stop valve;
    allowing solvent to flow from the inlet structure to the reservoir;
    opening the second stop valve; and
    allowing solvent to flow from the reservoir into the pneumatic system of a tractor-trailer.

8. The method according to claim 7, comprising closing the first stop valve prior to opening the second stop valve.

9. The method according to claim 7, wherein the device is configured to add solvent to the pneumatic system when the pneumatic system is either pressurized or unpressurized.

10. The method according to claim 7, wherein the reservoir comprises a pressure relief valve disposed thereon.

11. The method according to claim 7, wherein the device includes a pressure relief valve disposed on the reservoir.

12. The method according to claim 11, comprising:
    opening the pressure-relief valve;
    relieving excess pressure in the reservoir; and
    closing the pressure relief valve;
    all prior to opening the first stop valve.

* * * * *